No. 682,123. Patented Sept. 3, 1901.
W. R. WILSON.
HAY FEVER DISK.
(Application filed Aug. 7, 1900.)

(No Model.)

Witnesses,
H. M. Neff

Inventor,
William Rolla Wilson,
By
Attorney.

UNITED STATES PATENT OFFICE.

WILLIAM ROLLA WILSON, OF DENVER, COLORADO.

HAY-FEVER DISK.

SPECIFICATION forming part of Letters Patent No. 682,123, dated September 3, 1901.

Application filed August 7, 1900. Serial No. 26,189. (No model.)

*To all whom it may concern:*

Be it known that I, WILLIAM ROLLA WILSON, a citizen of the United States of America, residing at Denver, in the county of Arapahoe and State of Colorado, have invented certain new and useful Improvements in Hay-Fever Disks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in devices for curing hay-fever. As is well known, hay-fever is attended by excessive inflammation of the mucous membrane of the nasal passages, sometimes resulting in the complete stoppage of these passages by reason of the swollen condition of the surrounding parts. This inflammation of the lining membrane of the nostrils is caused by poisonous dust carried to the said membrane by the air in breathing.

This invention is illustrated in the accompanying drawings, in which—

Figure 1:
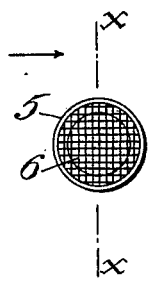
Figure 3:
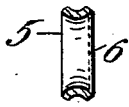
Figure 4:
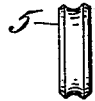
Figure 5:
Figure 2:

Figure 1 is a rear view, Fig. 2 a front view, Fig. 3 a section, Fig. 4 an end view, and Fig. 5 a perspective view, of the device.

This device I term a "hay-fever disk;" and it consists of a flexible circular band 5, preferably composed of soft rubber, provided with a diaphragm composed of a gauze or other suitable material forming a sort of strainer which catches the dust and prevents it from passing through the nasal ducts, and therefore from coming in contact with the lining membrane of these ducts.

A very important feature of the device consists of the exterior concavity of the band 5, whereby it becomes self-retaining in the nostril. In use one of these disks is inserted in each nostril of the patient and lodged a short distance from its exterior extremity. It becomes very essential that the device should be automatically maintained in its proper position. By reason of the band's exterior concavity a partial vacuum is formed between its exterior surface and the lining membrane of the nostril after the band is inserted and pressed out from the inside flat against the surrounding wall of the passage, whereby the atmosphere is excluded. Hence the exterior pressure of the air maintains the device in place.

In order to facilitate the insertion of the device with the aforesaid end in view, the gauze diaphragm 6 is preferably placed in the plane or approximately in the plane of the rear edge of the device, leaving a sufficient width of band in front of the diaphragm to allow the end of the finger to be passed around on the inside for the purpose stated. This form of construction facilitates the insertion of the device, since the band may be easily grasped by the thumb and finger without danger of injuring the delicate gauze diaphragm. Hence the edge of the band to which the gauze is attached is innermost or in the rear when the device is inserted. The utility of this device for the purpose stated has been demonstrated by actual use by hay-fever patients.

Having thus described my invention, what I claim is—

A device of the class described consisting of a flexible exteriorly-concave band having a dust-straining diaphragm applied thereto, the diameter of the band being substantially the same on both edges.

In testimony whereof I affix my signature in presence of two witnesses.

WILLIAM ROLLA WILSON.

Witnesses:
PYRL VAN WINKLE,
MARY C. LAMB.